(12) United States Patent
Krishnamurti et al.

(10) Patent No.: US 6,506,854 B2
(45) Date of Patent: Jan. 14, 2003

(54) INHIBITING SCALE IN VINYL MONOMER POLYMERIZATION

(75) Inventors: Ramesh Krishnamurti, Bangalore (IN); Sandor Nagy, Mason, OH (US); Qi Wang, Grand Island, NY (US); Habib Hichri, Fishkill, NY (US)

(73) Assignee: Occidental Chemical Corporation, Dallas, TX (US)

( * ) Notice: Subject to any disclaimer, the term of this patent is extended or adjusted under 35 U.S.C. 154(b) by 0 days.

(21) Appl. No.: 09/862,799

(22) Filed: May 22, 2001

(65) Prior Publication Data

US 2002/0015692 A1 Feb. 7, 2002

Related U.S. Application Data

(60) Continuation-in-part of application No. 09/477,104, filed on Jan. 4, 2000, now Pat. No. 6,300,427, which is a division of application No. 09/131,347, filed on Aug. 10, 1998, now Pat. No. 6,114,476.

(51) Int. Cl.$^7$ .............................. C08F 2/18; C08G 85/00
(52) U.S. Cl. .......................... 526/62; 526/72; 526/315; 526/316; 526/344
(58) Field of Search ............................ 526/62, 72, 315, 526/316, 344, 74

(56) References Cited

U.S. PATENT DOCUMENTS

| | | | | |
|---|---|---|---|---|
| 3,969,244 A | * | 7/1976 | Kobayashi et al. | 210/688 |
| 4,105,838 A | * | 8/1978 | Kitamura et al. | 526/62 |
| 5,442,002 A | * | 8/1995 | Shimizu et al. | 524/81 |
| 5,484,855 A | * | 1/1996 | Shimizu et al. | 526/62 |
| 5,484,856 A | * | 1/1996 | Shimizu et al. | 526/62 |

* cited by examiner

*Primary Examiner*—David W. Wu
*Assistant Examiner*—R. Harlan
(74) *Attorney, Agent, or Firm*—Richard D. Fuerle

(57) ABSTRACT

Disclosed is a solution that comprises
 (A) a solvent;
 (B) about 0.001 to about 20 wt % of a terpolymer that comprises the condensation reaction product of
  (1) an aromatic compound that contains a benzene or naphthalene ring substituted with the group OR or SR, where R is hydrogen, alkyl from $C_1$ to $C_{15}$, or aryl, alkaryl, or aralkyl from $C_6$ to $C_{15}$;
  (2) about 0.1 to about 10 moles of a carbonyl compound per mole of said aromatic compound; and
  (3) about 0.1 to about 10 moles of a thiourea per mole of said aromatic compound
 (C) about 1 to about 5 wt % of a base;
 (D) about 0.1 wt % to saturation of a salt; and
 (E) 0 to about 20 wt % of an alcohol.

Also disclosed is a method of making the terpolymer in the absence of an acid catalyst and a method of inhibiting the formation of scale on reactor components in contact with polymerizing vinyl chloride monomer.

20 Claims, No Drawings

INHIBITING SCALE IN VINYL MONOMER POLYMERIZATION

This application is a continuation-in-part of application Ser. No. 09/477,104, filed Jan. 4, 2000, now U.S. Pat. No. 6,300,427, which is a division of application Ser. No. 09/131,347, filed Aug. 10, 1998, now U.S. Pat. No. 6,114,476.

BACKGROUND OF THE INVENTION

This invention relates to a terpolymer for inhibiting the formation of scale on reactor surfaces that are in contact with polymerizing vinyl monomers. In particular, it relates to a method of making the terpolymer without an acid catalyst and to a solution of the terpolymer, a salt, and a base.

When vinyl monomers are polymerized, scales of the polymer adhere to the reactor walls and to reactor components, such as stirrers. The deposition of this scale reduces the yield of the polymer, reduces heat transfer efficiency during heating and cooling of the reactor, and lowers monomer efficiency and general process control. Some of the scale flakes off during polymerization of the monomer and mixes with the rest of the polymer, which makes the polymer less processable and reduces its quality. For example, when vinyl chloride monomer (VCM) is polymerized, scales of polyvinyl chloride (PVC) can flake off and form "fish eyes" πin the PVC.

Cleaning the reactor to remove this scale is normally required after each batch, resulting in considerable reactor downtime as well as increased cost in producing the polymer. Because VCM can become entrapped in the scale, the physical removal of the scale by an operator could result in the exposure of the operator to the harmful monomer.

EP 343,706 teaches that polythioureas of the general formula [NHRNHC(S)]n (where R is an arylene group substituted by a carboxylic acid group) can be used to reduce scale formation in vinyl chloride polymerization reactors. JP 01,217,016 discloses a scale preventing compound comprising an alkali metal xanthogenate, polyethyleneimine, and a dialdehyde. In JP 59,32,482, dithiocarboxylic acids or salts containing OC(=S)S or NC(=S)S groups and/or (RO)2P(S)SR derivatives are disclosed as scale preventing agents. U.S. Pat. No. 4,431,783 discloses that naphthol/formaldehyde condensates formed by a base-catalyzed process are effective scale-preventing agents vinyl chloride polymerization reactors. While many of these scale prevention agents are effective in preventing scale, they can alter the color of the resulting PVC, giving it a yellowish tinge. Customers of high quality PVC prefer a pure white or colorless PVC and regard any color in the PVC as an indication of inferior quality.

SUMMARY OF THE INVENTION

We have discovered that a terpolymer of an aromatic compound, a carbonyl compound, and a thiourea can be made without using an acid catalyst. By omitting an acid catalyst, the terpolymer can be made with less cost as not only is the cost of the acid catalyst avoided, but subsequent neutralization and disposal of the acid catalyst is also avoided. We have further found that the terpolymer is more effective in reducing scale when a solution of it, a base, and a salt is applied to the reactor components. The scale prevention agent of this invention is very effective in preventing the formation of scale on reactor components that come in contact with polymerizing VCM. Because there is little or no scale, there are fewer fish eyes. It is easily prepared from commercially available, inexpensive, non-toxic materials and can be applied in an aqueous medium, thereby avoiding the use of potentially harmful and flammable organic solvents. Quite unexpectedly, the scale prevention agent of this invention imparts little or no color to the resulting PVC.

DESCRIPTION OF THE PREFERRED EMBODIMENTS

The terpolymer used in the process of this invention is the condensation reaction product of an aromatic compound, a carbonyl compound, and a thiourea. The aromatic compound contains the group:

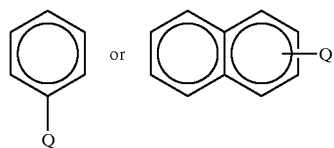

where Q is OR or SR and R is hydrogen, alkyl from $C_1$ to $C_{15}$, or aryl, alkaryl, or aralkyl from $C_6$ to $C_{15}$. The Q group is preferably OR and the R group is preferably hydrogen as phenols are more readily available and work well. Preferred aromatic compounds include:

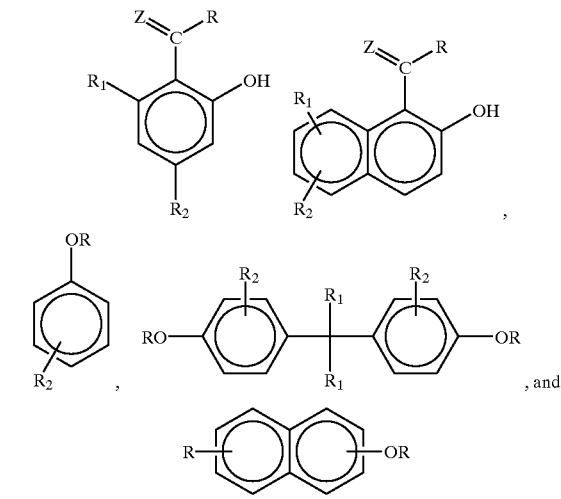

where Z is 0 or NOH, each $R_1$ is independently selected from OH, R, $SO_3R$, and $CO_2R$, and each $R_2$ is independently selected from $R_1$, SH, SR, haloalkyl from $C_1$ to $CO_{15}$, and alkoxyaryl, naphthyl, and polycyclic aryl from $C_6$ to $C_{15}$. Examples of suitable aromatic compounds include salicylic acid, 1-naphthol, thiosalicylic acid, hydroxybenzenesulfonic acid isomers, 4-hydroxybenzoic acid, 2'-hydroxypropiophenone oxime, and 2'-hydroxypropiophenone; 2'-hydroxypropiophenone and 1-naphthol are preferred due to their low cost, low toxicity, and good performance in the terpolymer condensate. Mixtures of the aromatic compounds can also be used.

The carbonyl compound can be an aliphatic mono or dialdehyde, an aromatic aldehyde, or an aliphatic mono or diketone. Compounds, such as trioxane, that form the carbonyl compound under the reaction conditions, are also contemplated. Preferred carbonyl compounds have the general formula:

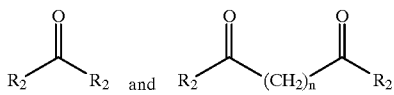

where each $R_2$ is independently selected as hereinabove defined and n is an integer from 1 to 10. Examples of suitable carbonyl compounds include acetaldehyde, glyoxal, benzaldehyde, dialkyl ketones such as acetone and methyl ethyl ketone, diaryl ketones such as benzophenone and ring-hydroxylated and sulfonated benzophenones, alkyl aryl ketones such as acetophenone, ring-hydroxylated acetophenones, and ring-sulfonated acetophenones, and formaldehyde and oligomers thereof, such as trioxane. Preferably, the carbonyl compound is formaldehyde or an oligomer thereof as those compounds have low cost, high reactivity, and are readily available. Mixtures of carbonyl compounds are also contemplated.

The thiourea has the general formula

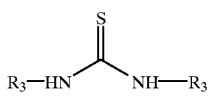

where each $R_3$ is independently selected from $NH_2$ and $R_2$. Examples of suitable thioureas include thiourea, thiocarbamide, monomethyl thiourea, 1,3-dimethyl-2-thiourea, 1-phenyl-2-thiourea, semicarbazide, thiosemicarbazide, and thiocarbohydrazide. The preferred thioureas are thiourea and thiosemicarbazide because they work the best, are inexpensive, and are readily available. Mixtures of thioureas can also be used.

The terpolymer is made by preparing a mixture of its three components. The most preferred combination of the three components is a 1-naphthol-formaldehyde-thiosemicarbazide (NFTS) terpolymer as it has the best combination of properties. For every mole of the aromatic compound, about 0.1 to about 10 moles of the carbonyl compound and about 0.1 to about 10 moles of the thiourea can be used. If less than 0.1 moles of the carbonyl compound is used, the terpolymers produced will have a lower molecular weight, and if more than 10 moles of the carbonyl compound is used, the terpolymer will have lower solubility. If less than 0.1 moles of the thiourea is used, the terpolymer will be less effective in preventing scale formation and, if more than 10 moles of the thiourea is used, the terpolymer will be less soluble. Preferably, for each mole of the aromatic compound, about 0.1 to about 5 moles of the carbonyl compound and about 0.1 to about 5 moles of the thiourea are used.

While the condensation reaction of the terpolymer components can be carried out in an acidic or basic medium, which also acts as the catalyst, preferably no acidic or basic catalyst is used as it has been found that none is needed. Mineral acids, such as hydrochloric acid and sulfuric acid, and organic acids, such as acetic acid, can be used as an acid catalyst and bases such as sodium hydroxide, potassium hydroxide, calcium hydroxide, magnesium hydroxide, barium hydroxide, sodium carbonate, potassium carbonate, and organic tertiary amines can be used as a basic catalyst. The strength of the acidic or basic catalyst can vary from about 1M to about 6M. If a catalyst is used, typically about 50 to about 500 wt % of it is used, based on the total weight of the terpolymer components.

The condensation reaction of the terpolymer components can be performed in water or in a polar organic solvent such as an alcohol (e.g., methanol, ethanol, propanol), a ketone (e.g., acetone, methyl ethyl ketone), an ester (e.g., ethyl acetate), or a dipolar aprotic solvent, such as sulfolane, tetrahydrofuran, N,N-dimethylformamide (DMF), N-methylpyrrolidone, cyclohexanone, dimethoxyethane, or diethyleneglycol dimethyl ether. Water is the preferred solvent because it is nonflammable and is not hazardous to the operator. Mixed solvent systems comprising combinations of solvents, including combinations of organic solvents with water, can also be used. It is preferable to choose a solvent system in which the terpolymer product is insoluble and precipitates.

The terpolymer can be prepared according to the method described in the Indian Journal of Chemistry, Vol 22A, pages 117 to 119, (1983), herein incorporated by reference. Typically, the aromatic compound, the carbonyl compound, and the thiourea taken together constitute from about 5 to about 50 wt % of the reaction system weight. The reaction can be effected by heating to temperatures of up to 150° C. for up to 8 hours. Once the terpolymer has been prepared, it can be collected and purified if desired. While we do not wish to be bound by any theories, we believe that the NFTS terpolymer has the formula:

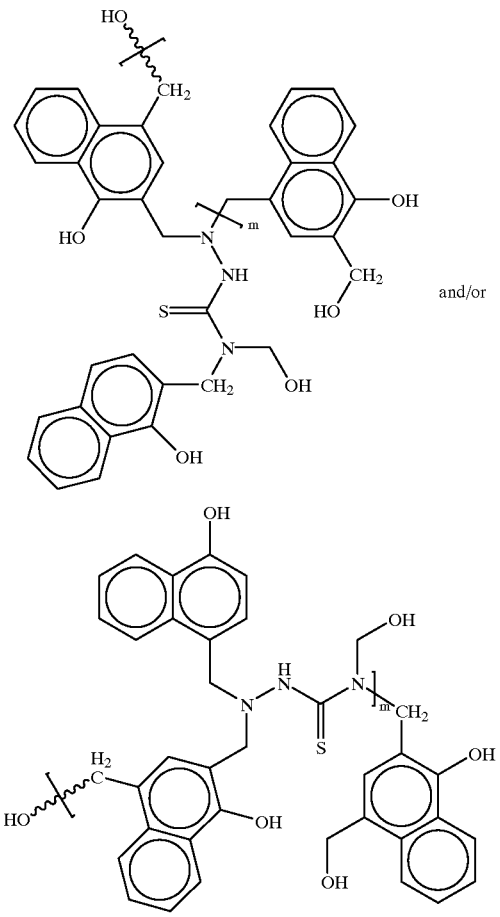

and/or where n is 1 to 15.

The terpolymer is preferably dissolved in a solvent to form a solution containing about 0.001 to about 20 wt % terpolymer. Solutions containing less terpolymer are less effective and solutions containing more terpolymer inhibit the polymerization of the VCM. Preferably, the solution contains about 0.01 to about 6 wt % terpolymer. Solvents that can be used to form the solution include, for example, water, alkaline water, and various organic solvents such as methylene chloride, tetrahydrofuran, dimethyl formamide, and dimethylsulfoxide. Up to about 20 wt % of the solvent can be an alcohol to help solubilize the terpolymer; water-miscible alkanols such as methanol and ethanol are preferred.

If a basic solution is used as the solvent, about 1 to about 5 wt % of a base (based on solution weight) is included in the solution. Less base is less effective in dissolving the terpolymer and more base is unnecessary; the preferred amount of base is about 0.5 to about 2 wt %. Suitable bases include NaOH, KOH, LiOH, and $Ca(OH)_2$; the preferred base is NaOH because it is inexpensive.

The solution also includes a salt, which enhances the effectiveness of the solution in inhibiting scale formation. While any salt, including organic salts, can be used, the preferred salts are inorganic salts of a strong acid (e.g., HCl, $H_2SO_4$, $HNO_3$, $H_3PO_4$) and a strong base (e.g., NaOH, KOH) as they are more effective; sodium chloride is especially preferred as it is inexpensive. The maximum amount of salt is the amount that can be dissolved in the solvent, typically about 15% for most salts in water. The amount of salt used in the solution should be at least about 0.1 wt %, as less is not very effective. Preferably, the amount of salt is about 8 to about 10 wt % of the solution.

Various other components can be added to the solution to enhance the performance of the terpolymer as an antifouling agent. For example, about 10 to about 500 wt % (based on solution weight) of an inorganic binder can be included in the solution to increase the binding of the terpolymer to the reactor surfaces. Examples of suitable inorganic binders include colloidal silica and alumina, titanium (IV) oxide, zirconium (IV) oxide, aluminum hydroxide, vanadium (V) oxide, and sodium silicate. The preferred inorganic binder is colloidal silica because of its low cost and good performance.

About 1 to about 100 wt % (based on terpolymer weight) of a surface active agent can also be included in the solution to increase the adhesion of the terpolymer to the reactor surfaces. Examples of suitable surface active agents include poly(vinyl acetate) (PVA) of varying degrees of hydrolysis, hydroxyethyl cellulose, hydroxypropyl cellulose, phytic acid, poly(vinyl formal), and gelatin. The preferred surface active agent is PVA of varying degrees of hydrolysis because of its low cost and good performance.

A preferred solution is about 0.01 to about 6 wt % terpolymer, about 0.1 to about 5 wt % base, about 0.1 to about 15 wt % salt, possibly an alcohol, and the rest water. The most preferred solution has a pH of about 12 to about 13 and comprises NFTS, aqueous NaOH, NaCl, organic solvent, inorganic binder, and a surface active agent.

The solution of the terpolymer can be applied to the reactor walls and to reactor components that are in contact with the VCM by any suitable means including, for example, spraying, flooding, painting, and brushing. After the application, it is not necessary to evaporate the solvent from the coating composition. Generally, the solids content of the coating on the reactor walls and components should be about $1 \times 10^{-5}$ to about $1 \times 10^{-3}$ g/square inch (about $1.6 \times 10^{-6}$ to about $1.6 \times 10^{-4}$ g/cm$^2$) as less may not be effective and more is unnecessary.

The solid terpolymer can also be added directly to the polymerization composition. For emulsion polymerizations, the polymerization composition typically consists of water, vinyl monomer, a free radical initiator, and an emulsifier. For suspension polymerizations, the polymerization composition typically consists of water, vinyl monomer, a free radical initiator, and a suspending agent. Generally, about 0.0001 to about 0.01 wt % of the solid terpolymer is added to the polymerization composition, based on the weight of the monomer. Less terpolymer is ineffective and more terpolymer may inhibit polymerization of the monomer.

While the present invention is particularly suitable for polymerizations in an aqueous medium, such as suspension or emulsion polymerization, the terpolymer of this invention can also be used in gas phase or bulk polymerizations of vinyl monomers. The terpolymer can be used in both continuous and batch polymerizations.

The following examples further illustrates this invention.

EXAMPLES 1 to 8

No Acid Catalyst

To a solution of 1-naphthol (9 g) and thiosemicarbazide (5.6 g) in ethanol (60 mL) was added excess formaldehyde (46 mL) dropwise with good mechanical stirring. After about 10 minutes, the reaction mixture clarified to give a red-brown solution. The temperature gradually went up to 30° over the next half hour, during which tan solids began to precipitate. After stirring for a total of 2.5 hours, the reaction mixture was filtered, washed with ethanol, hot water, ethanol again, and finally vacuum dried to give 10 g of NFTS terpolymer as a fine tan powder. Using the same procedure, but varying the reaction conditions and mole ratios, different NFTS terpolymers were prepared. Table 1 gives the results.

TABLE 1

| Example | N/F/TS (mole ratio) | Reaction Conditions | Yield (g) |
|---|---|---|---|
| 1 | 1/10/1 | No heating, 2.5 h | 10 |
| 2 | 1/10/1 | Reflux, 1 h | 15.4 |
| 3 | 1/10/1 | 50° C., 1 h | 14.7 |
| 4 | 1/10/1 | Reflux, 4h | 15.6 |
| 5[a] | 1/10/0.5 | Heat from RT to reflux | 11.3 |
| 6 | 1/10/0.5 | No heating, 1 h | 12.4 |
| 7[b] | 1/10/0.5 | No heating, 5 h | 6.1 |
| 8 | 1/10/1 | No heating, 5 h | 15.4 |

[a]Used 1M aqueous NaOH as a solvent. No solids precipitated from the dark red reaction mixture.
[b]No ethanol used.

Examples 1 to 8 show that the terpolymer of this invention can be prepared without using an acid catalyst.

EXAMPLE 9

Scaled Up Reaction

An 18 L reactor preheated with a circulating bath set at 45° C. and equipped with a mechanical stirrer set at about 300 rpm and a reflux was filled with 8000 mL of ethanol solvent. The reactor was charged with 2400 g 1-naphthol and 727 g thiosemicarbazide. A solution of 37 wt % aqueous formaldehyde was pumped into the reactor at about 120 mL/hr so as to maintain an internal reactor temperature of 40 to 45° C. until 6743 g of the solution had been added. Stirring was continued for about 16 hrs. A light brown to brown slurry formed which was filtered to isolate the solid NFTS resin. The filter cake was washed with 38.4 kg of hot water, then with 31.2 L ethanol at RT, then dried at 25 to 30° C. for about 16 hrs. Three runs produced 2478.2 g, 2304.3 g, and 2424.5 g of NFTS.

EXAMPLES 10 to 27

Suspension Polymerization of Vinyl Chloride

General Procedure.

A 500 mL EZE SS-316 autoclave equipped with a cooling jacket and a stirrer (from Autoclave Engineers) was coated completely on its inner surfaces with a coating solution containing 2 wt % NFTS and other inorganic components dissolved or suspended in a solution made of about 2 wt % aqueous NaOH and ethanol in a 4:1 weight ratio. All the examples used 10 wt % NaCl, except for Examples 10 and 11. The autoclave was sealed and subjected to three cycles of evacuation followed by nitrogen purge. After evacuating the autoclave again, a water solution of 0.1 g of "Methocell E50" in 190 mL of deaerated, demineralized water was sucked into the autoclave. Then 24 mL of a 1% poly(vinyl alcohol) (80% hydrolyzed; Aldrich) in degassed, demineralized water was introduced via a septum into the autoclave. The autoclave was evacuated again briefly without being stirred and was cooled to about 5° C. Vinyl chloride gas was condensed into the autoclave with stirring until ¼ lb (113 g) of monomer had been transferred. When the internal pressure was below 20 psig (138 kPa), the polymerization initiator (0.05 mL t-butyl peroxyneodecanoate and 0.05 mL t-amyl peroxypivolate) was syringed out and injected into the autoclave via a septum and the mixture was agitated at 500 rpm. The coolant fluid circulation to the reactor jacket was stopped and another circulating bath pre-heated to about 72° C. was connected to the reactor jacket. The reactor temperature was set to 62° C. on the control tower. The internal reactor temperature reached 62° C. in about 0.5 h. After being stirred for 5 h, heating was turned off, the excess vinyl chloride was vented off, and the PVC water slurry was filtered. The PVC obtained was air dried at room temperature to a constant weight. Fouling of the reactor was rated on a scale from 1 to 5, with 1 being the least fouling and 5 the worst. Table 2 gives the results.

TABLE 2

| Ex. | Inorganic Component (wt %) | Fouling Observations Above Surface | At Surface | Below Surface | PVC (g) | Comments |
|---|---|---|---|---|---|---|
| 10* | .....— | 1 | 1.5 | 2.5 | 81 | 1/10/1 NFTS. |
| 11* | — | 1 | 1.5 | 3.5 | 81 | 2nd overcoat without cleaning autoclave |
| 12 | .....— | 1.1 | 1.1 | 1 | 76 | 1/10/1 NFTS |
| 13 | TiO$_2$ (2) | 1 | 1.1 | 1 | 68 | 1/10/1 NFTS |
| 14 | " | 1 | 1 | 1 | 69 | 2nd overcoat without cleaning autoclave. |
| 15 | " | 1 | 1 | 1 | 67 | 3rd overcoat without cleaning autoclave. |
| 16 | " | 1 | 1 | 1 | 66 | 4th overcoat without cleaning autoclave. |
| 17 | " | 1 | 1 | 1 | 70 | 5th overcoat without cleaning autoclave. |
| 18 | Amorphous alumina$^a$ (2) | 1 | 1.1 | 1 | 66 | 1/10/1 NFTS |
| 19 | Amorphous alumina$^a$ (2) | 1 | 1.1 | 1 | 68 | 2nd overcoat without cleaning autoclave. |
| 20 | Amorphous alumina$^a$ (2) | 1 | 1 | 1 | 68 | 3rd overcoat without cleaning autoclave. |

TABLE 2-continued

| Ex. | Inorganic Component (wt %) | Fouling Observations Above Surface | At Surface | Below Surface | PVC (g) | Comments |
|---|---|---|---|---|---|---|
| 21 | Amorphous alumina$^a$ (2) | 1 | 1 | 1 | 69 | 4th overcoat without cleaning autoclave. |
| 22 | Amorphous alumina$^a$ (2) | 1 | 1 | 1 | 71 | 5th overcoat without cleaning autoclave. Alumina worked as well as TiO$_2$. |
| 23 | Not Used | 1 | 1 | 1.5 | 84 | 2/10/1 NFTS |
| 24 | " | 1 | 1 | 1 | 77 | 2nd overcoat without cleaning autoclave. |
| 25 | " | 1 | 1 | 1 | 77 | 3rd overcoat without cleaning autoclave. |

$^a$Sold by Cabot
*Comparative example

The examples described in Table 2 show that less fouling occurred when NaCl was present compared to Examples 10 and 11, when it was not used.

We claim:
1. A solution comprising
   (A) a solvent;
   (B) about 0.001 to about 20 wt % of a terpolymer that comprises the condensation reaction product of
      (1) an aromatic compound that contains a benzene or naphthalene ring substituted with the group OR or SR, where R is hydrogen, alkyl from $C_1$ to $C_{15}$, or aryl, alkaryl, or aralkyl from $C_6$ to $C_{15}$;
      (2) about 0.1 to about 10 moles of a carbonyl compound per mole of said aromatic compound; and
      (3) about 0.1 to about 10 moles of a thiourea per mole of said aromatic compound
   (C) about 0.1 to about 5 wt % of a base;
   (D) about 0.1 wt % to saturation of a salt; and
   (E) 0 to about 20 wt % of an alcohol.
2. A solution according to claim 1 wherein said solvent is water.
3. A solution according to claim 2 wherein said base is sodium hydroxide.
4. A solution according to claim 1 wherein said salt is sodium chloride.
5. A solution according to claim 1 wherein said aromatic compound is selected from the group consisting of

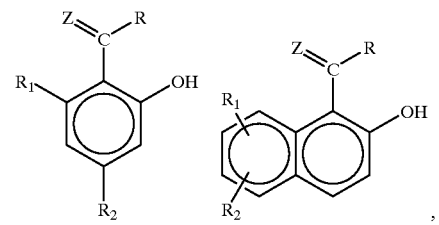

-continued

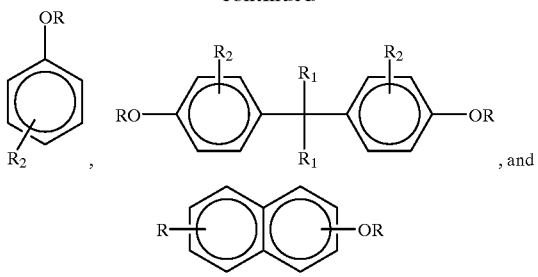
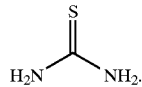

where Z is O or NOH, each $R_1$ is independently selected from the group consisting of OH, R, $SO_3R$, and $CO_2R$, and each $R_2$ is independently selected from the group consisting of $R_1$, SH, SR, haloalkyl from $C_1$ to $C_{15}$, alkoxyaryl, naphthyl, and polycyclic aryl from $C_6$ to $C_{15}$.

6. A solution according to claim 1 wherein said aromatic compound is 2'-hydroxypropiophenone or 1-naphthol.

7. A solution according to claim 1 wherein said carbonyl compound is selected from the group consisting of compounds having the general formula

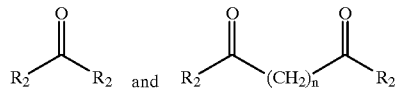

where each $R_2$ is independently selected from the group consisting of OH, R, $SO_3R$, $CO_2R$, SH, SR, haloalkyl from $C_1$ to $C_{15}$, alkoxyaryl, naphthyl, and polycyclic aryl from $C_6$ to $C_{15}$, and n is an integer from 1 to 10.

8. A solution according to claim 7 wherein carbonyl compound is formaldehyde or an oligomer thereof.

9. A solution according to claim 1 wherein said thiourea has the general formula

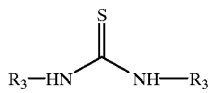

where each $R_3$ is independently selected from the group consisting of $NH_2$, OH, R, $SO_3R$, $CO_2R$, SH, SR, haloalkyl from $C_1$ to $C_{15}$, alkoxyaryl, naphthyl, and polycyclic aryl from $C_6$ to $C_{15}$.

10. A solution according to claim 9 wherein said thiourea is thiosemicarbazide or has the formula

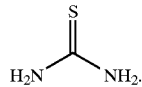

11. A solution according to claim 1 wherein said terpolymer is made in the absence of an acid catalyst.

12. A solution according to claim 11 wherein said terpolymer is made in the absence of any catalyst.

13. A method of inhibiting the formation of scale on reactor surfaces in contact with a polymerizing vinyl monomer comprising coating said reactor surfaces with a solution according to claim 1.

14. A solution comprising
   (A) water;
   (B) about 0.01 to about 6 wt % of a terpolymer that comprises the condensation reaction product of (1) an aromatic compound selected from the group consisting of compounds having the general formula

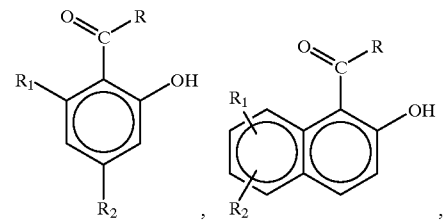
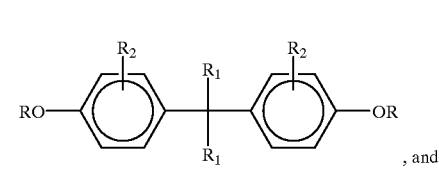

(2) about 0.1 to about 5 moles per mole of said aromatic compound of a carbonyl compound selected from the group consisting of compounds having the general formula

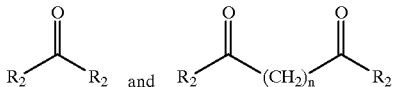

where n is an integer from 1 to 10; and (3) about 0.1 to about 5 moles per mole of said aromatic compound of a thiourea having the general formula

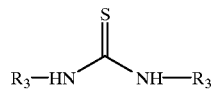

where R is hydrogen, alkyl from $C_1$ to $C_{15}$, or aryl, alkaryl, or aralkyl from $C_6$ to $C_{15}$, each $R_1$ is independently selected from the group consisting of OH, R, $SO_3R$, and $CO_2R$, each $R_2$ is independently selected from the group consisting of $R_1$, SH, SR, haloalkyl from $C_1$ to $C_{15}$, alkoxyaryl, naphthyl, and polycyclic aryl from $C_6$ to $C_{15}$, and each $R_3$ is independently selected from the group consisting of $NH_2$ and $R_2$;

(C) about 0.5 to about 2 wt % sodium hydroxide;

(D) about 8 to about 10 wt % sodium chloride; and (E) 0 to about 20 wt % methanol or ethanol.

15. A solution according to claim 14 wherein said aromatic compound is 2'-hydroxypropiophenone or 1-naphthol.

16. A solution according to claim 14 wherein carbonyl compound is formaldehyde or an oligomer thereof.

17. A solution according to claim 14 wherein said thiourea is thiosemicarbazide or has the formula

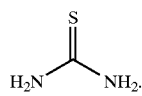

18. A method of making a terpolymer comprising the condensing, in the absence of an acid catalyst, (1) an aromatic compound that contains a benzene or naphthalene ring substituted with the group OR or SR, where R is hydrogen, alkyl from $C_1$ to $C_{15}$, or aryl, alkaryl, or aralkyl from $C_6$ to $C_{15}$;

(2) about 0.1 to about 10 moles per mole of said terpolymer of a carbonyl compound per mole of said aromatic compound; and (3) about 0.1 to about 10 moles per mole of said terpolymer of a thiourea per mole of said aromatic compound.

19. A method of inhibiting the formation of scale on reactor components in contact with polymerizing vinyl chloride monomer comprising (1) preparing a solution of
  (A) a solvent;
  (B) about 0.001 to about 20 wt % of a terpolymer prepared according to the method of claim 18;
  (C) about 1 to about 5 wt % of a base;
  (D) about 0.1 wt % to saturation of a salt; and
  (E) 0 to about 20 wt % of an alcohol; and (2) applying said solution to said components.

20. A method of inhibiting the formation of scale inside a reactor comprising adding about 0.0001 to about 0.01 wt % of a terpolymer made according to the method of claim 18 to a monomer and polymerizing said monomer in said reactor.

* * * * *